(12) United States Patent
Ishida

(10) Patent No.: US 6,564,828 B1
(45) Date of Patent: May 20, 2003

(54) CHECK VALVE

(75) Inventor: Takuya Ishida, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/714,467

(22) Filed: Nov. 16, 2000

(30) Foreign Application Priority Data

Dec. 27, 1999 (JP) .............................. 11-369004

(51) Int. Cl.$^7$ ............................... F16K 15/02
(52) U.S. Cl. .................... 137/515.5; 137/543.19; 251/337
(58) Field of Search ................ 137/515.5, 540, 137/543.19, 543.21; 285/331; 251/337, 902

(56) References Cited

U.S. PATENT DOCUMENTS

| 1,886,205 | A | * | 11/1932 | Lyford | 137/543.17 |
|---|---|---|---|---|---|
| 2,310,080 | A | * | 2/1943 | Hill | 137/613 |
| 2,888,034 | A | * | 5/1959 | Glegg | 251/902 |
| 3,664,371 | A | * | 5/1972 | Schneider | 137/543.19 |
| 3,770,009 | A | * | 11/1973 | Miller | 137/543.19 |
| 4,142,549 | A | * | 3/1979 | Autry | 137/543.21 |
| 4,286,636 | A | * | 9/1981 | Credle | 251/149.6 |
| 4,637,430 | A | * | 1/1987 | Scheffel et al. | 137/543.21 |
| 4,766,930 | A | * | 8/1988 | Patti | 137/543.21 |
| 5,046,526 | A | | 9/1991 | Longmore et al. | 137/515.5 |
| 5,092,229 | A | * | 3/1992 | Chen | 137/543.21 |
| 5,158,439 | A | * | 10/1992 | Fukumoto | 417/394 |
| 5,193,579 | A | * | 3/1993 | Bauer et al. | 137/543.19 |
| 5,349,984 | A | | 9/1994 | Weinheimer et al. | 137/543.21 |
| 5,533,548 | A | * | 7/1996 | Grant | 137/540 |
| 5,636,768 | A | * | 6/1997 | Yamada | 137/509 |
| 5,873,385 | A | * | 2/1999 | Bloom et al. | 137/535 |
| 6,024,345 | A | * | 2/2000 | Nishio | 267/165 |
| 6,279,606 | B1 | * | 8/2001 | Hunnicutt et al. | 137/538 |

* cited by examiner

Primary Examiner—Michael Powell Buiz
Assistant Examiner—Ramesh Krishnamurthy
(74) Attorney, Agent, or Firm—Baker & Daniels

(57) ABSTRACT

An rear end surface of a slide guide plate 12 extending rearward beyond a valve disc 6 is configured to abut against a rear step surface when the valve disc 6 is moving in a valve-opening direction, thus regulating a movement amount of the valve disc 6. This prevents the spring 7 from entering such an excessive compressive state that in a valve-opened state it is fully compressed. As a result, even in a case where the spring 7 is made of a synthetic resin, deterioration, due to stress relaxation, in a springing force can be suppressed, to suppress deterioration in a pressing pressure onto the valve disc 6 in the valve-closing direction, thus maintaining stable check valve functions.

14 Claims, 3 Drawing Sheets

PRIOR ART

CHECK VALVE

BACKGROUND OF THE INVENTION

1. Field of the Invention

The invention relates to a synthetic resin made check valve provided to a pipeline somewhere therethrough in which a washing solution or a corrosive solution flows in, for example, a semiconductor manufacturing process.

2. Description of the Related Art

There are imposed high degree requirements for cleanness on a check valve provided to a pipeline somewhere therethrough for supplying a washing solution or an etching solution in a washing step or etching step during a semiconductor manufacturing process. To avoid contamination due to metal ions, especially, a check valve provided to such a pipeline somewhere therethrough is made of a synthetic resin excellent in corrosion resistance and wear resistance such as a fluororesin (e.g., PFA, PP, PE).

Conventionally, such a check valve is configured, as shown in FIG. 3 for example, in such a way that to a channel 51 passing through a PFA-made check valve main body 50 is provided a large-diameter valve disc housing chamber 52, in which are housed a spherical ball valve disc 53 and a spring 54 for pressing this ball valve disc 53 in a valve-closing direction. These ball valve disc 53 and the spring 54 are also made of a synthetic resin such as PFA.

With a check valve having the above-mentioned configuration, the channel 51 arranged on the upstream side (right side in the figure) of the valve disc housing chamber 52 is held in a valve-closed state with the ball valve disc 53 as butted by a pressing pressure of the spring 54 against a marginal open edge (valve seat) 55 open to the valve disc housing chamber 52. If, on the other hand, a fluid pressure of a fluid flowing into the above-mentioned channel 51 exceeds in strength a springing force of the spring 54, the ball valve disc 53 moves in a valve-opening direction as compressing the spring 54. With this, this ball valve disc 53 is separated from the above-mentioned valve seat 55 into a valve-opened state, thus flowing the fluid via the valve disc housing chamber 52 toward the downstream side.

The check valve with the above-mentioned configuration, however, suffers from a problem that as the springing force of the spring 54 weakens, sealing performance of the valve in its opened state with the ball valve disc 53 as butted against the valve seat 55 is gradually deteriorated. That is, the spring 54 is provided into the valve disc housing chamber 52 as having a predetermined amount of compressive deformation in order to hold the ball valve disc 53 as butted against the valve seat 55 in the valve-closed state. With this, when the valve is opened, that compressive deformation amount becomes even larger.

In this state, with the check valve of the above-mentioned configuration, the spring 54 is liable to be put into a full compressed state in response to a fluid pressure of an incoming fluid, thereby generating a large internal pressure. When used repeatedly in such a stress state, the spring 54 made of a synthetic resin is subjected to stress relaxation (creep), thus easily deteriorating from its initial springing force. This in turn reduces the pressing force in the valve-closed state, thus making it impossible to maintain sufficient check valve functions.

SUMMARY OF THE INVENTION

In view of the above, it is an object of the invention to provide a check valve that can maintain its own stable functions by suppressing deterioration in the springing force of the spring made of a synthetic resin.

With this, a check valve specified in claim 1 comprises: a check valve main body having a channel passing therethrough; a synthetic resin-made valve disc provided to the above-mentioned channel somewhere therethrough, for opening and closing this channel; a spring made of a synthetic resin for pressing this valve disc in the valve-closing direction; and valve-disc movement-amount regulating means for regulating an amount of the valve of moving in the valve-opening direction to prevent the spring from being subjected to full compression, wherein if the above-mentioned valve disc is subjected to a fluid pressure in the valve-opening direction in excess of a pressing pressure of the spring, the valve disc may be opened in the valve-opening direction with the spring as compressed, thus opening the above-mentioned channel.

With this configuration, even when a large fluid pressure is applied to the valve disc in its opening direction, the valve is regulated halfway in its movement by the valve-disc movement-amount regulating means, thus holding the spring as subjected to a compression amount lower than a full compression amount. With this, the spring can be prevented from being compressive-deformed excessively, so that it is possible to suppress deterioration due to stress relaxation in the springing force of the spring, even though it is made of a synthetic resin. As a result, deterioration can be suppressed in the pressing force of the spring onto the valve disc in its closing direction when it is returned to its closed state, thus maintaining stable check valve functions.

claim 2 features the check valve specified in claim 1, wherein spring holding means is provided for suppressing displacement of the spring in a radial direction.

With this configuration, it is possible to suppress displacement of the spring in a radial direction, to inhibit axial shift between this spring and the valve disc. As a result, deviation can be suppressed from occurring in the pressing force of the spring onto the valve disc butted against the valve seat of the check valve main body when it is closed, to maintain a uniform pressing state everywhere on a circumference, thereby providing good sealing performance in the valve-closed state.

claim 3 features the check valve specified in claim 1 or 2, wherein the spring is formed integrally into the valve disc.

With such a configuration that the spring is integrated into the valve disc, it is possible to even more securely suppress axial shift from occurring between the spring and the valve disc, thus maintaining good sealing performance in the valve-closed state.

claim 4 features the check valve specified in claim 1, 2, or 3, wherein the valve disc is mounted at its tip in the valve-closed direction with a sealing member having larger elasticity than the valve disc.

With this configuration, even in such a state where, for example, a shocking valve-closing operation occurs repeatedly to the valve disc, good sealing performance can be maintained when the valve is closed. That is, in such a configuration that, during the above-mentioned valve-closing operation, the valve disc made of a synthetic resin would be directly touched to and separated from the valve seat of the check valve main body, a local portion of the valve disc pressed against the valve seat is liable to have a recess or any other plastic deformation, thus deteriorating sealing performance. To guard against this, as mentioned above, the valve disc is mounted with a highly elastic sealing member in such a configuration that it may be touched to and separated from the valve seat, in order to suppress the above-mentioned plastic deformation at the local portion, thus maintaining good sealing performance in the valve-closed state.

claim 5 features the check valve specified in any one of claims 1 through 4, wherein the check valve main body is divided along the channel in formation into an upstream side main body and a downstream side main body in such a configuration that a lip sealing portion is provided at the positions of these two main bodies facing each other in the channel direction.

Thus, the check valve main body consisting of the upstream-side and downstream-side main bodies has a sealing construction by use of the lip sealing portion to which a sufficient surface pressure is applied, thus suppressing liquid leakage etc. even more securely.

claim 6 features the check valve specified in any one of claims 1 through 5, wherein the check valve main body is divided along the channel in formation into an upstream-side main body and a downstream-side one in such a configuration that outer peripheries of surfaces are welded and sealed, of these two main bodies facing each other in the channel direction.

Thus, with such a sealing construction that the upstream-side and downstream-side main bodies are welded to each other, it is possible to provide a check valve with even improved performance for preventing liquid-leakage etc.

claim 7 features the check valve specified in any one of claims 1 through 6, wherein the above-mentioned synthetic resin is a fluororesin.

With this, it is possible to provide a check valve excellent in corrosion resistance and wear resistance at the same time as being free of metal elution even in the case of flowing of a corrosive fluid.

BRIEF DESCRIPTION OF THE DRAWINGS

FIG. 1A is a outer appearance view showing an overall configuration, FIG. 1B is a cross-sectional view, FIG. 1C is a perspective view indicating a valve disc and a spring mounted in the check valve, and FIG. 1D is a cross-sectional view indicating a valve-opened state;

FIG. 2A is a cross-sectional view showing an overall configuration, FIG. 2C is a perspective view indicating a valve disc, a spring, and a sealing ring mounted in the check valve, and FIG. 2D is a cross-sectional view indicating a valve-opened state.

DESCRIPTION OF THE PREFERRED EMBODIMENTS

Figure 1:
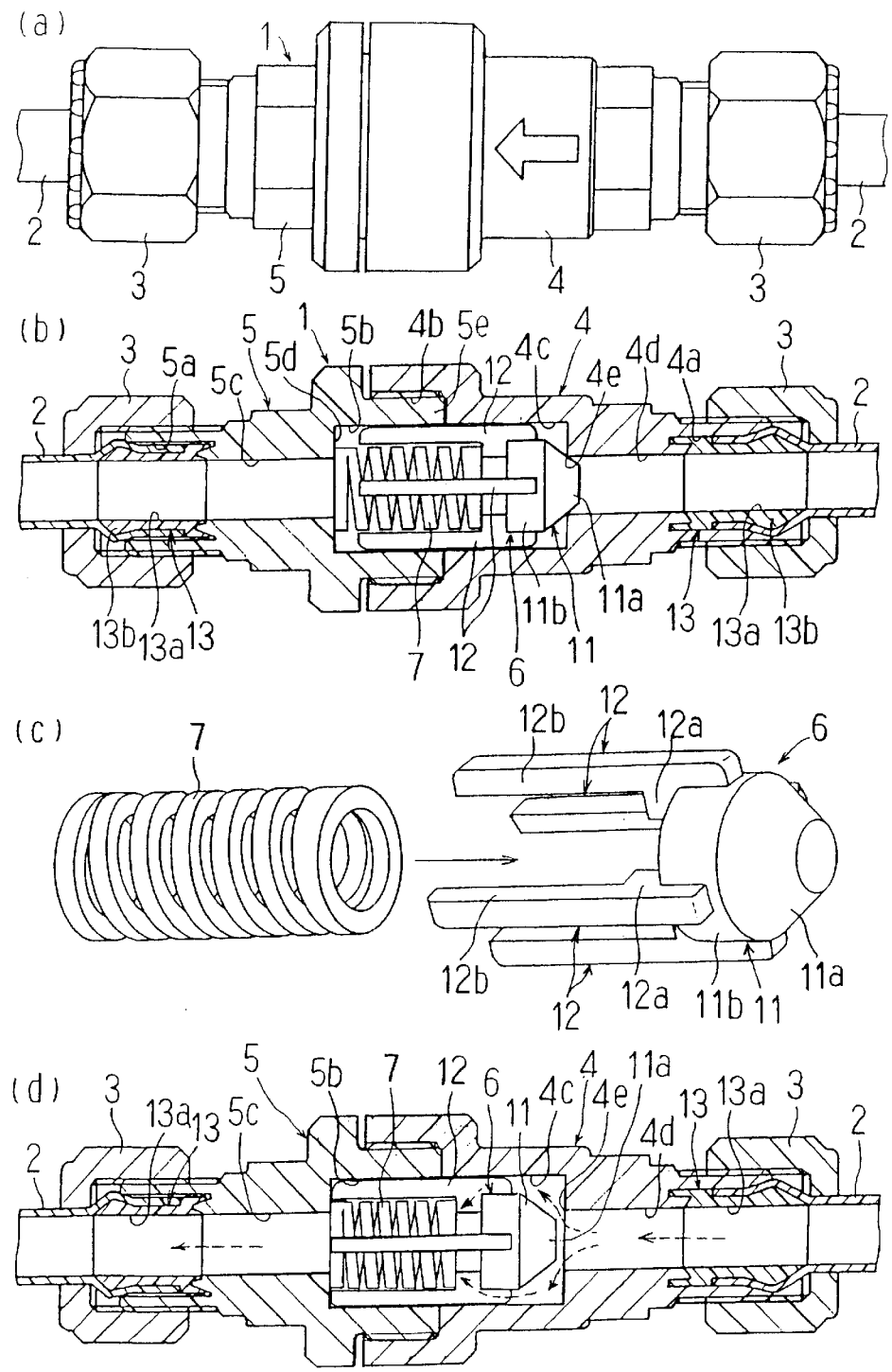
FIG. 1 show a check valve according to one embodiment of the invention.

The following will describe embodiments of the invention with reference to the drawings.

First Embodiment

As shown in FIG. 1A, a check valve according to this embodiment has a union joint configuration, whereby at the opposite ends of a valve main body (check valve main body) 1 are screwed two nuts 3 by two tubes 2 respectively. The valve main body 1 is, as shown in FIG. 1B, divided into an upstream-side main body (hereinafter called IN-side main body) 4 shown on the right side in the figure and a downstream-side main body (hereinafter called OUT-side main body) 5 in such a configuration that these two main bodies are linked with each other in a coaxial manner. Note here that in the check valve according to this embodiment, later described valve disc 6, spring 7 and other components are all made of a synthetic resin such as PFA, which is excellent in corrosion resistance and wear resistance.

The IN-side main body 4 has at its right end a tube connecting recess 4a inserted to itself axially from an end surface. Into this recess portion 4a is inserted to be connected therewith a tube 2 into which a later described sleeve 13 is pressed. At its left end, on the other hand, the IN-side main body 4 has a main body-linking recess 4b and a smaller-diameter valve-disc housing space 4c which are sequentially inserted from the end surface toward the right end side. With this, by communicating these valve-disc housing space 4c and the tube connecting recess 4a to each other by use of an IN-side orifice channel portion 4d with an inside diameter having a predetermined size, to form in this IN-side main body 4 a step-shaped through hole along the axis core.

A marginal open edge through which the IN-side orifice channel portion 4d is opened to the valve disc housing space 4c is formed as a later described valve seat 4e which the valve disc 6 is touched to and separated from. At the outer periphery, on the other hand, of a wall surface surrounding the tune connecting recess 4a is formed a male screw and on an inner surface of the main-body linking recess 4b is formed a female screw.

The OUT-side main body 5 also has at its left end side almost the same tube connecting recess 5a and at its right end side a spring housing portion 5b inserted from the end surface toward the left end surface. This spring housing portion 5b is formed so as to have the same inside diameter size as the above-mentioned valve-disc housing space 4c. With this, by communicating the tube connecting recess 5a and the sparing housing portion 5b to each other via an OUT-side orifice channel portion 5c having a predetermined inside diameter size, an axial through hole is formed also in this OUT-side main body 5. By linking this OUT-side main body 5 to the IN-side main body 4, a channel is formed which passes through the valve main body 1 along its axis.

Note here that a step surface between the OUT-side orifice channel portion 5c and the spring housing portion 5b is formed as a spring receiving surface 5d to which the later described spring 7 is seated. A wall surface surrounding the spring housing portion 5b, on the other hand, has at its outer periphery a male screw formed as a linking portion 5e. By driving and tightening the above-mentioned male screw to the female screw in the inner surface of this recess 4b as inserting this linking portion 5e to the main body linking recess 4b in the IN-side main body 4, this OUT-side main body 5 is linked to the IN-side main body 4 in a coaxial manner. In this state, the end surface of the linking portion 5e is pressed to the bottom surface of the main body linking recess 4b in the IN-side main body 4 so as to seal off the IN-side main body 4 and the OUT-side main body 5 from each other.

In this linkage state, also, the valve disc housing space 4c of the IN-side main body 4 and the spring housing portion 5b of the OUT-side main body 5 are assembled in an axially integral linkage manner, to house in this resultant linkage space the valve disc 6 and the spring 7 formed in a shape of a compressive coil spring, thus configuring this check valve.

As shown in FIG. 1C, the valve disc 6 comprises at its right end side in the figure (hereinafter called front) a valve disc base 11 having a tapered valve portion 11a having a forward decreasing diameter and a cylinder portion 11b linked from the left end side (hereinafter called rear) to this valve portion 11a, in such a configuration that on an outer periphery of this valve disc base 11 is provided a plurality of rearward extending, four in an illustrated example, slide guide plates 12. In this embodiment, as mentioned later, the plurality of slide guide plates 12 combines, in configuration, a function of regulating means for regulating an mount of movement of this valve disc 6 in the valve-opening direction and a function of spring holding means for suppressing radial displacement of the spring 7.

The above-mentioned plurality of slide guide plates 12 is provided, in series as projecting in shape outward in a radial direction to the respective positions evenly spaced from each other in a circumferential direction on an outer peripheral surface of the cylinder portion 11b of the valve base 11 and also extending, in shape, rearward beyond the rear end surface of the cylinder portion 11b. Also, the end surfaces on the axial core side extending rearward from the rear end surface of the cylinder portion 11b are each formed in a two-step shape, so that the cylinder 11b side may serve as a spring receiving portion 12a and its rear portion may serve as a spring fitting portion 12b. That is, a spacing between the spring receiving portions 12a mutually facing each other with the axial core therebetween is sized smaller than an inside diameter of the spring 7 and that between the spring fitting portions 12b is sized almost the same as an outside diameter of the spring 7 so as to fit it as almost fitted therebetween. Also, an axial size of the spring fitting portions 12b is set as not to disturb an appropriate compressing function of the spring 7 in a state range from a natural length to a full compressed length of the spring 7.

With this, by inserting the front end side of the spring 7 to the inside of each spring fitting portion 12b, this spring 7 can be held on almost the same axis as the valve disc 6 and, at the same time, the front end of this spring 7 is positioned as butted against the step surface between the spring receiving portion 12a and the spring fitting portion 12b.

Thus, as shown in FIG. 1B, the valve 6 with the spring 7 as attached to the inside of each slide guide plate 12 is housed in the valve disc housing space 4c and the spring housing portion 5b, thus configuring the check valve according to this embodiment. In this assembled state, the valve disc 6 is pressed forward by a spring force of the spring 7 compressed axially to thereby press the tapered valve portion 11a at the tip of the valve disc 6 everywhere on the circumference of the above-mentioned valve seat 4e and hold it in the valve-closed state where communication is cut to the IN-side orifice channel 4d toward the valve disc housing space 4c.

Also, each slide guide plate 12 is in a state that each outward radial end surface is shaped as to be fitted to the inner circumferential surfaces of the valve disc hosing space 4c and the spring housing portion 5b. With this, the valve disc 6 and the spring 7 are configured to be held on the same axis as the IN-side orifice channel 4d and the OUT-side orifice channel 5c so as to move axially.

Note here that on the outer periphery of each of the joints on the front end side of the IN-side main body 4 and on the rear end side of the OUT-side main body 5 is formed a male screw to which each of the above-mentioned nuts 3 is screwed. By inserting to the above-mentioned tube connecting recesses 4a and 5a the tubes 2 into which the sleeves 13 are pressed respectively and then fitting the above-mentioned nuts 3 to the above-mentioned male screws respectively and tightening them axially, the tubes 2 are connected to the front end portion of the IN-side main body 4 and the rear end portion of the OUT-side main body 5 respectively.

The above-mentioned sleeves 13, for examples those at the front end side for connecting the tube 2 to the IN-side main body 4, each have on the axial core a through hole 13a formed on the outer periphery side having a diameter almost the same as the inside diameter of the IN-side orifice channel 4d and on the outer periphery side an expansion portion 13b having a diameter larger than the inside diameter of the tube 2. By fitting the nut 3 to the front end side of the IN-side main body 4 and tightening it axially, the rear end side of the sleeve 13 is pressed tight to the inner surface of the tube connecting recess 4a, thereby sealing off the sleeve 13 and the IN-side main body 4 from each other.

At the same time, the end portion side of the tube 2 is sandwiched between the tapered surface on the front end side of the tune connecting recess 4a and the above-mentioned expansion portion 13b, with surfaces of which are each pressed by the inner and outer surfaces of the tube 2. With this, the tube 2 and the sleeve 13 are sealed off from each other and also the tube 2 and the IN-side main body 4 are sealed off from each other, thus connecting this tube 2 to the IN-side main body 4 in a liquid-tight state. The sleeve 13 on the rear end side for connecting the tube 2 to the OUT-side main body 5 is also shaped almost the same as above, so that when the nut 3 is tightened, as mentioned above, the tube 2 is connected to the OUT-side main body 5 in a liquid-tight manner.

The tubes 2 are thus connected at the opposite ends, which permits for example washing water or a chemical solution to flow through the forward tube 2 and the through hole 13a in the sleeve 13 to the IN-side orifice channel 4d, so that if a fluid pressure onto the valve disc base 11 of the valve disc 6 exceeds a pressing force by the spring 7 in the valve-closing direction, as shown in FIG. 1D, the valve disc 6 moves rearward, to provide the valve-opened state where the valve portion 11a is separated rearward from the valve seat 4e.

With this, as indicated by a broken-line arrow in the figure, a fluid flows from the IN-side orifice channel 4d into the valve disc housing space 4c. Then, the fluid once passes by the valve disc base 11 rearward to the outside and passes via the space on the axial core of the spring 7 through the spring housing portion 5b, the OUT-side orifice channel 5c, and the through hole 13a in the rear sleeve 13 into the rear tube 2, thus keeping a right flowing state from forward to backward directions through this check valve.

On the other hand, when the fluid pressure of the fluid flowing to the IN-side orifice channel 4d drops or when the fluid pressure on the rear side with respect to the valve portion 11a becomes higher than that on the front side, the resultant pressure difference and a pressing force of the spring 7 cause the valve disc 6 to move forward, so that as shown in FIG. 1B, the valve-closed state is entered, whereby the valve portion 11a is pressed against the valve seat 4e, thus blocking reverse directional flow of the fluid from rearward to forward directions. Thus, the pressure difference between opposite sides of the valve portion 11a automatically switches the valve-opened state to the valve-closed state and vice versa, thereby maintaining the check valve functions for permitting only the right directional flow.

In the valve-opened state, the spring 7 has compressive deformation according to a fluid pressure on the upstream side of the valve disc 6, thus causing it to move rearward. In this state, with the check valve according to this embodiment, the valve disc 6 does not move rearward beyond a position shown in FIG. 1D when it responds to an increase in the fluid pressure. That is, in this state, the rearward end surface of each of the slide guide plates 12 of the valve disc 6 abuts in configuration against the above-mentioned spring receiving surface 5d interposed between the spring housing portion 5b and the OUT-side orifice channel 5c, thereby preventing the valve disc 6 from moving any more.

Therefore, the spring 7 hits the peak in compressive deformation amount at the above-mentioned movement position of the valve disc 6 and so cannot be deformed any more. This prevents the spring 7 from having excessive compressive deformation, so that even in a case where this spring 7 is made of a synthetic resin such as PFA, drop due to stress relaxation in springing force can be suppressed. This resultantly suppresses valve-closing directional drop in pressing force onto the valve disc 6 in a case where the valve-closed state is recovered, for example, when the fluid pressure is dropped, thus maintaining stable check valve functions for a prolonged period.

When returning from the valve-opened state to the valve-closed state, on the other hand, the valve disc 6 is permitted to move along the axial core because the outward axial end surface of each slide guide plate 12 is guided on the inner surface of the spring housing portion 5b or the valve disc housing space 4c. With this, the valve disc 6 is held as butted against the valve seat 4e everywhere on its circumference, thus preventing deviation from occurring in the pressing state of the valve portion 11a against the valve seat 4e. With this, therefore, good sealing performance can be maintained in the valve-closed state.

Further, the spring 7 is prevented from being deformed in an axial direction because its outer periphery is surrounded by the slide guide plates 12, thereby providing such a configuration as to permit only axial deformation. Therefore, the spring 7 can be prevented from having axial creep deformation, as a result of which such an acting state is held that this spring 7 presses this valve disc 6 only axially, thus suppressing a shift between the direction of pressing by the spring 7 and the valve-closing direction of the valve disc 6. Therefore, this also causes the pressing force of the spring 7 to be uniformly applied around the axial core to the valve portion 11a butted against the valve seat 4e, to prevent deviation from occurring in the pressing state, thus maintaining even better sealing performance in the valve-closed state.

Second Embodiment

Figure 2:
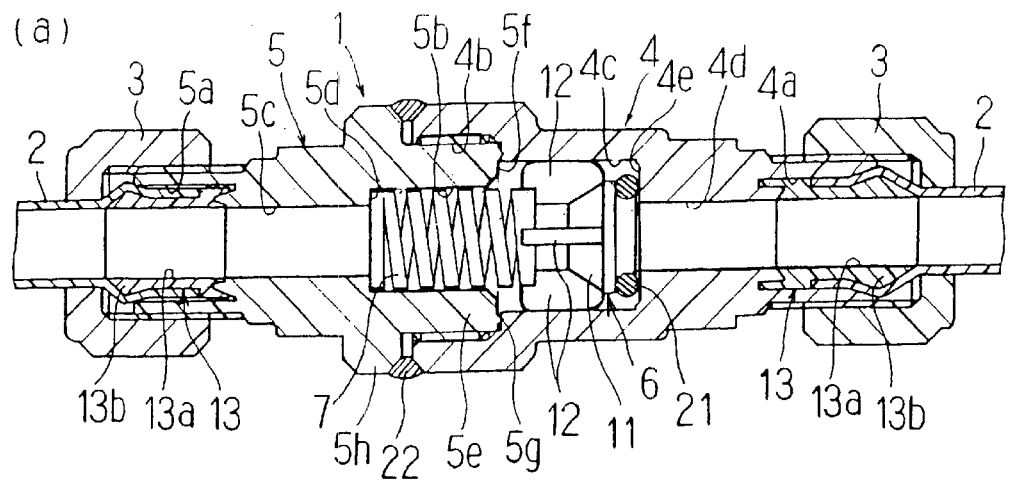
FIG. 2 show a check valve according to another embodiment of the invention.
Figure 2:
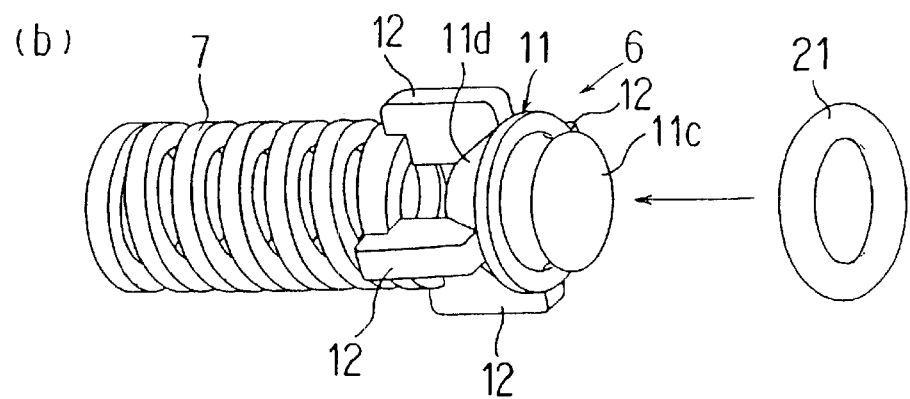
Figure 2:
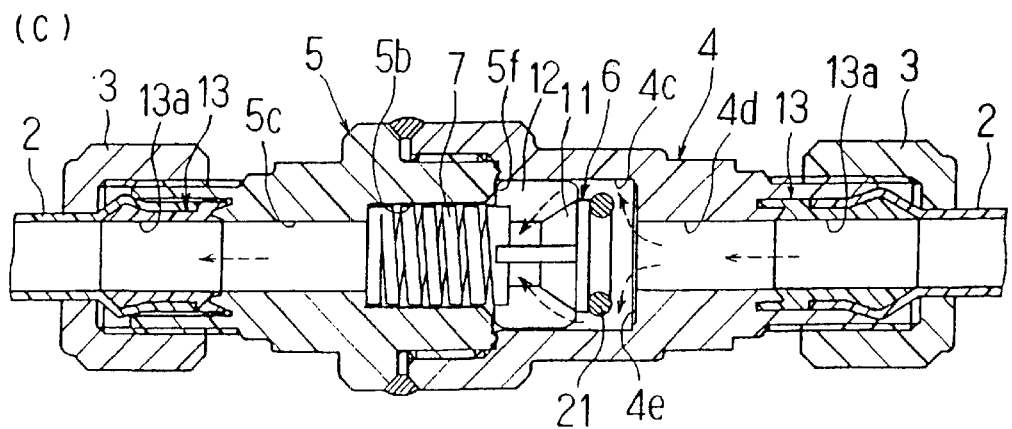
Figure 3:
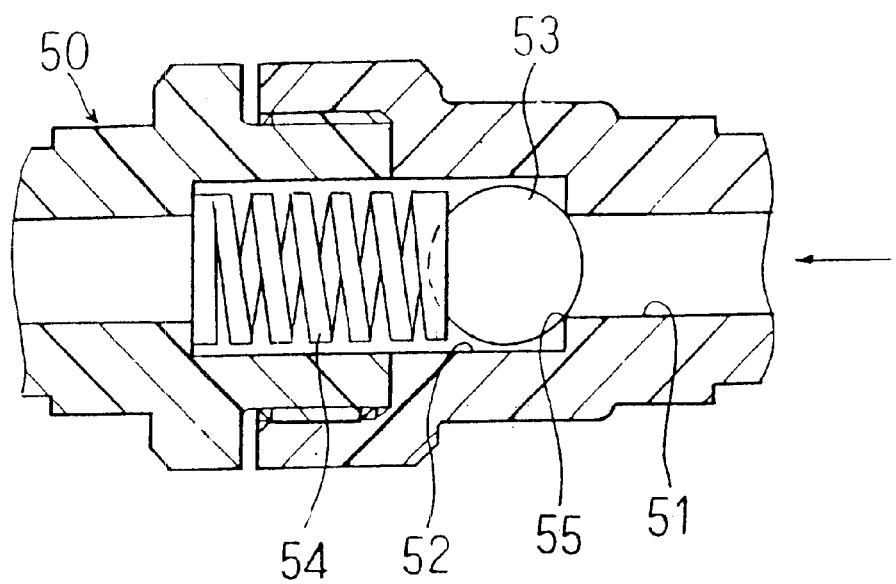
FIG. 3 is a cross-sectional view indicating main components of a prior art check valve.

The following will describe a second embodiment with reference to FIG. 2. For convenience in description, the components having the same functions as those indicated in FIG. 1 are indicated by the same reference signs, so that they are not detailed here.

A check valve according to this embodiment has such a configuration shown in FIG. 2A that the spring housing portion 5b of the OUT-side main body 5 has a smaller diameter than the valve disc housing space 4c of the IN-side main body 4, with its inside diameter set in matching with the outside diameter of the spring 7 so that this spring 7 may be positioned as almost fitted to this spring housing portion 5b.

The valve disc 6 housed in the valve disc housing space 4c, on the other hand, has such a configuration shown in FIG. 2B that the valve body base 11 is formed to have, in shape, the right end side seal ring mounting portion 11c and the reverse tapered conical station 11d having a rearward decreasing diameter placed behind this seal ring mounting portion 11c.

The seal ring mounting portion 11c has its outer periphery arc-shaped, in cross section, so as to be inserted inward in a radial direction, so that this seal ring mounting portion 11c may be mounted with a seal ring 21 consisting of an O-ring having a circular cross section. As this seal ring 21 is selected such an O-ring as having a little larger diameter than an axial thickness size of the seal ring mounting portion 11c.

Therefore, the seal ring 21 is mounted to the seal ring mounting portion 11c a little projected forward beyond the end surface of the seal ring mounting portion 11c. With this, this seal ring 21 can act as a valve portion touched to and separated from the later described valve seat 4e. Note here that this seal ring 21 is made of fluorine rubber etc. having larger elasticity than a synthetic resin such as PFA which the valve disc 6 and the check valve main body 1 are made of.

At positions evenly spaced in a peripheral direction on the outer periphery of the above-mentioned conical station 11d, the four slide guide plates 12 are integrally formed into such a shape as to protrude to the outside in a radial direction and extend rearward like in the case of the above-mentioned first embodiment. These slide guide plates 12, however, are formed to have a shorter rearward length. At the rear end of these slide guide plates 12 is integrally formed the spring 7 as shaped to extend rearward. That is, the axial core sides of the rearward ends of these slide guide plates 12 are mutually connected in a peripheral direction by a spring end portion of the spring 7, thus integrally forming the spring 7 rearward extending from this spring end portion spirally with the valve disc 6 in a coaxial manner.

Thus, the seal ring 21 is mounted to the above-mentioned seal ring mounting portion 11c of the valve disc 6 to which the spring 7 is formed integrally, to cause these valve disc 6 and spring 7 to be housed as shown in FIG. 2A in the valve disc housing space 4c and the spring housing portion 5b, thus configuring the check valve according to this embodiment.

In this case, a surface of a step between the IN-side orifice channel 4d and the valve disc housing space 4c is formed as the valve seat 4e which the seal ring 21 is touched to and separated from, which functions as the valve portion as mentioned above. Also, the slide guide plates 12 of the valve disc 6 have each their radial outward end surface shaped so as to fit to the inner surface of the valve disc housing space 4c as mentioned above. Also, since the spring housing portion 5b is formed so as to have a smaller diameter than the valve disc housing space 4c, the step surface between these provides a valve disc movement regulating surface 5f placed as facing, in an axial direction, the rear end surface of each slide guide plate 12 with a predetermined spacing therebetween.

On the OUT-side main body 5 of this embodiment, on the other hand, a lip sealing portion 5g projecting, in a mountain-like cross section, toward the IN-side main body 4 is integrally formed all over the circumference at the right end surface of the linking portion 5e surrounding the spring housing portion 5b.

The IN-side main body 4 and the OUT-side main body 5, which house the above-mentioned valve disc 6 and the spring 7, screw the linking portion 5e to the main body linking recess 4b almost the same way as above, thus being linked with each other. In this case, the above-mentioned lip sealing portion 5g is screwed until it is butted in an axial direction against the step surface between the valve disc housing space 4c and the main body linking recess 4b of the IN-side man body 4. At this position, therefore, more secure sealing is provided between the IN-side main body 4 and the OUT-side main body 5.

Also, with the check valve according to this embodiment, after the IN-side main body 4 and the OUT-side main body 5 are linked with each other, the rear side outer periphery of the IN-side main body 4 and the outer periphery of the annular flange-shaped portion 5h of the OUT-side main body 5 rearward adjacent thereto are welded with each other, thus forming a weld portion 22 which seals the two everywhere on their circumference in assembly. Therefore, this weld portion 22 further gives secondary sealing between the IN-side main body 4 and the OUT-side main body 5.

Even with the check valve having the above-mentioned configuration, in such a state as shown in FIG. 2A, the valve disc 6 is pressed forward by a springing force of the spring 7, to thereby butt the sealing ring 21 at the tip against the valve seat 4e, thus keeping the valve-closed state in which the IN-side orifice channel 4d is blocked. If, in this state, the pressure of a fluid flowing to the IN-side orifice channel 4d exceeds a pressing force of the spring 7 in the valve-closing direction, the valve disc 6 moves rearward, as shown in FIG. 2C, thus providing the valve-opened state where the sealing ring 21 is separated rearward from the valve seat 4e.

In this case, also, if the rear end surface of each slide guide plate 12 abuts against the above-mentioned valve disc movement regulating surface 5f interposed between the valve disc housing space 4c and the spring housing portion 5b when the valve disc 6 moves rearward as the fluid pressure increases, the valve disc 6 is prevented from moving further. Therefore, the spring 7 hits the peak in compressive movement amount at the above-mentioned movement position of the valve disc 6, thus having no more deformation. With this, deterioration in the springing force of the spring 7 can be suppressed, to resultantly suppress deterioration of the pressing force on the valve disc 6 in the valve-closing direction, thus maintaining stable check valve functions for a prolonged period.

Also, in the movement of the valve disc 6 returning from the valve-opened state to the valve-closed state, the radial outward end surface of each slide guide plate 12 is guided in the inner surface of the spring housing portion 5b, to keep such a state that the sealing ring 21 is uniformly butted against the valve seat 4e everywhere on the circumference, thus maintaining good sealing performance in the valve-closed state.

Further, since the spring 7 is almost entirely fitted into the spring housing portion 5b and so prevented from being deformed in a radial direction, this spring 7 is kept free of creep deformation etc. in a radial direction as mentioned above, to thereby suppress a shift from occurring in the pressing direction of the spring 7 and the valve-closing direction of the valve disc 6, thus also maintaining good sealing performance in the valve-closed state as mentioned above. With this check valve according to this embodiment, therefore, the above-mentioned slide guide plate 12 provides, in configuration, valve disc movement amount regulating means like in the case of the above-mentioned first embodiment, while the spring housing portion 5b provides spring holding means for suppressing radial displacement of the spring 7.

According to this embodiment, however, since the spring 7 is integrally formed with the valve disc 6 in a coaxial manner, there is no possibility of a axial-core directional shift occurring between the spring 7 and the valve disc 6, to thereby securely suppress deviation in the surface pressure on the valve disc 6 butted against the above-mentioned valve seat 4e, thus maintaining better sealing performance.

In contrast to a prior art check valve having the valve disc and the spring configured separately from each other whereby if a shocking pressure fluctuation such as by a water hammer is applied on them from the inside or outside of the pipeline, the valve disc and the spring may be separated to give rise to a shift in a relative positional relationship therebetween, thus disabling the check valve functions, according to the check valve of this embodiment having the spring 7 integrally formed to the valve disc 6, even when such a shocking pressure fluctuation is applied to them, the spring 7 is not separated from the valve disc 6, thus also maintaining further stable check valve functions.

Also, this embodiment employs the highly elastic sealing ring 21 as a valve portion touched to and separated from the valve seat 4e. That is, in a case where both the valve seat 4e and the valve portion are made of the same material of a synthetic resin such as PFA, if for example a shocking valve-closing operation is repeated, plastic deformation may develop locally at a position where stress is concentrated, thus deteriorating sealing performance. To guard against this, one of the two is formed of a material having higher elasticity than the other to relax the concentration of stress, in order to keep a uniform pressing state everywhere on the circumference, thus maintaining good sealing performance.

Further, the check valve according to this embodiment employs, between the IN-side main body 4 and the OUT-side main body 5, primary sealing by use of the lip sealing portion 5g and secondary sealing by use of the weld portion 22, thus making it possible to completely preventing an internal fluid from leaking out. In particular, for example, a chemical or pure water used in a semiconductor manufacturing process has a very high purity, so that check valve malfunctions due to meshing-in of dust etc. scarcely occur. Therefore, especially by providing the above-mentioned configuration for complete leakage prevention by use of such welding as described above, a check valve can be provided which is appropriate for semiconductor or LCD manufacturing processes.

Although the specific embodiments of the invention have been described above, the invention is not limited to them but may be modified in a variety of manners within a scope of the invention. For example, although such a check valve has been exemplified that the various components are made of PFA, other synthetic resins such as PTFE, ETFE, CTFE, and ECTFE excellent in chemical resistant or heat resistant or combinations thereof may be employed to form these various components.

Also, although such a check valve has been exemplified that has a union joint configuration having a joint to opposite ends of which are connected the tubes 2, it is possible to apply the invention also to such a check valve that has a configuration for providing one end with, for example, a tube-use tapered male or female screw. Also, although the second embodiment has been described with respect to such a configuration that the sealing ring 21 consisting of an O-ring is provided as the sealing member mounted to the tip of the valve disc 6, this sealing member may be made of, for example, a rubber cap or any other highly elastic materials.

As mentioned above, the check valve specified in claim 1 of the invention has such a configuration that the valve disc movement amount regulating means for regulating an amount of movement of the valve disc in the valve-opening direction is provided to prevent the spring from having excessive compressive deformation, so that even if this spring is made of a synthetic resin, deterioration, due to stress relaxation, of it springing force can be suppressed, to inhibit deterioration in the pressing force onto the valve disc in the valve-closing direction, thus maintaining stable check valve functions.

The check valve specified in claim 2 comprises the spring holding means for suppressing displacement of the spring in a radial direction, so that an axial-core directional shift can be suppressed between the spring and the valve disc, to resultantly maintain an evenly butted state of the valve disc against the valve seat of the check valve main body when the valve is closed, thus also maintaining good sealing performance in the valve-closed state.

The check valve specified in claim 3 has the spring integrally formed to the valve disc, to thereby even securely suppress an axial-core directional shift between the spring and the valve disc, thus maintaining even better sealing performance in the valve-closed state.

The check valve specified in claim 4 has the valve-closing directional tip of the valve disc mounted with a sealing member having higher elasticity than the valve disc, so that even if a shocking valve-closing operation is applied repeatedly onto the valve disc, local deformation is suppressed from developing at the above-mentioned sealing member butted against the valve seat of the check valve main body, thus also maintaining good sealing performance in the valve-closed state.

The check valve specified in claim 5 has a lip sealing portion between the upstream-side main body and the downstream-side main body of the check valve main body, to seal them off from each other by applying a sufficient surface pressure onto this lip sealing portion, thus making it possible to even more securely suppress liquid leakage etc.

The check valve specified in claim 6 has such a sealing configuration that the upstream-side and downstream-side main bodies are welded to each other, thus providing such a check valve even more securely prevented from being subjected to liquid leakage etc.

The check valve specified in claim 7 can provide such a check valve that is excellent in corrosion resistance and wear resistance because it is made of a fluororesin and that is free of metal elution even when it is subjected to leakage of a corrosive fluid etc.

What is claimed is:

1. A check valve for use in a semiconductor manufacturing process, said check valve comprising:
    a check valve main body made of a synthetic resin, having a channel passing therethrough;
    a synthetic resin-made valve disc provided to said channel somewhere therethrough, for opening and closing said channel; and
    a synthetic resin-made spring for pressing said valve disc in a valve-closing direction, in such a configuration that when a valve-opening directional fluid pressure in excess of a pressing force of said spring is applied to said valve disc, said valve disc moves in a valve-opening direction with said spring being compressed, to open said channel;
    wherein said spring is formed coaxially to and integrally with said valve disc, said valve disc having a rear section defining a portion of a conical surface, said conical surface having a diameter which progressively decreases as said conical surface extends rearwardly toward said spring, said valve disc including a plurality of evenly spaced guide plates, said guide plates integrally formed and extending radially outwardly and rearwardly from said conical surface, said guide plates each having a rearward end and said spring being connected to said guide plates at radially inner portions of said rearward ends; and
    valve disc movement amount regulating means for regulating an amount of movement of said valve disc in the valve-opening direction in order to prevent full compression from occurring onto said spring.

2. The check valve according to claim 1, further comprising spring holding means for suppress radial displacement of said spring.

3. The check valve according to claim 1, wherein a valve-closing directional tip of said valve disc is mounted with a sealing member having higher elasticity than said valve disc.

4. The check valve according to claim 3, wherein said check valve main body is divided in formation along said channel into an upstream-side main body and a downstream-side main body; and
    a lip sealing portion is provided at a position where said upstream-side main body and said downstream-side main body face each other in a direction of said channel.

5. The check valve according to claim 4, wherein said check valve main body is divided in formation along said channel into said upstream-side main body and said downstream-side main body; and
    said upstream-side main body and said downstream-side main body are sealed off from each other by welding, to each other, outer periphery sides thereof mutually facing in said direction of said channel.

6. The check valve according to claim 3, wherein said synthetic resin is a fluororesin.

7. The check valve according to claim 2, wherein a valve-closing directional tip of said valve disc is mounted with a sealing member having higher elasticity than said valve disc.

8. The check valve according to claim 1, wherein said check valve main body is divided in formation along said channel into an upstream-side main body and a downstream-side main body; and
    a lip sealing portion is provided at a position where said upstream-side main body and said downstream-side main body face each other in a direction of said channel.

9. The check valve according to claim 2, wherein said check valve main body is divided in formation along said channel into an upstream-side main body and a downstream-side main body; and
    a lip sealing portion is provided at a position where said upstream-side main body and said downstream-side main body face each other in a direction of said channel.

10. The check valve according to claim 1, wherein said check valve main body is divided in formation along said channel into said upstream-side main body and said downstream-side main body; and
    said upstream-side main body and said downstream-side main body are sealed off from each other by welding, to each other, outer periphery sides thereof mutually facing in said direction of said channel.

11. The check valve according to claim 2, wherein said check valve main body is divided in formation along said channel into said upstream-side main body and said downstream-side main body; and said upstream-side main body and said downstream-side main body are sealed off from each other by welding, to each other, outer periphery sides thereof mutually facing in said direction of said channel.

12. The check valve according to claim 3, wherein said check valve main body is divided in formation along said channel into said upstream-side main body and said downstream-side main body; and said upstream-side main body and said downstream-side main body are sealed off from each other by welding, to each other, outer periphery sides thereof mutually facing in said direction of said channel.

13. The check valve according to claim 1, wherein said synthetic resin is a fluororesin.

14. The check valve according to claim 2, wherein said synthetic resin is a fluororesin.

* * * * *